US006650334B1

(12) United States Patent
Thomson et al.

(10) Patent No.: US 6,650,334 B1
(45) Date of Patent: Nov. 18, 2003

(54) OPTIMIZING TEXTURE TAG CHECKING FOR THREE-DIMENSIONAL COMPUTER GRAPHICS

(75) Inventors: John S. Thomson, Santa Clara, CA (US); William N. Ng, Sunnyvale, CA (US)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/245,531

(22) Filed: Feb. 5, 1999

(51) Int. Cl.[7] .................................................. G09G 5/00
(52) U.S. Cl. ........................................ 345/582; 345/552
(58) Field of Search ................................. 345/430, 431, 345/429, 150, 419–428, 508, 516, 514, 509, 513, 511, 418, 552, 467, 551, 581–588, 42, 561–563, 612–614, 653, 689, 501, 557; 711/6, 203, 209, 219, 118; 348/599, 453, 722; 382/277

(56) References Cited

U.S. PATENT DOCUMENTS

| | | | | |
|---|---|---|---|---|
| 5,550,960 A | * | 8/1996 | Shirman et al. | 345/430 |
| 5,566,285 A | * | 10/1996 | Okada | 345/430 |
| 5,987,567 A | * | 11/1999 | Rivard et al. | 711/118 |
| 6,002,410 A | * | 12/1999 | Battle | 345/513 |
| 6,052,127 A | * | 4/2000 | Vaswani et al. | 345/430 |
| 6,104,413 A | * | 8/2000 | Cheng et al. | 345/508 |
| 6,118,452 A | * | 9/2000 | Gannett | 345/418 |

OTHER PUBLICATIONS

"Microsoft Press Computer Dictionary", Third Edition, 1997, pp. 214–215 and 289.*

\* cited by examiner

*Primary Examiner*—Michael Razavi
*Assistant Examiner*—Thu Thao Havan
(74) *Attorney, Agent, or Firm*—Vedder, Price, Kaufman & Kammholz

(57) ABSTRACT

A circuit for texture tag checking includes a first comparison gate which compares a first dimension field of a tag with a first dimension element for a group of texels associated with a sample point. A second comparison gate compares a second dimension field of the tag with a second dimension element for the group of texels. A logic gate, coupled to each of the first and second comparison gates, is associated with one texel of the group of texels. The logic gate outputs a predetermined signal if the first and second dimension fields of the tag are the same as the first and second dimension elements, respectively.

10 Claims, 5 Drawing Sheets

OPTIMIZING TEXTURE TAG CHECKING FOR THREE-DIMENSIONAL COMPUTER GRAPHICS

TECHNICAL FIELD OF THE INVENTION

This invention relates generally to the field of computer graphics, and more particularly, to optimizing texture tag checking for three-dimensional computer graphics.

BACKGROUND OF THE INVENTION

Many applications of modern computer graphics strive to create three-dimensional images on a display device (e.g., a computer monitor) in order to provide a realistic virtual environment. In a typical imaging technique, a three-dimensional object is created by connecting a number of two-dimensional polygons, such as, for example, triangles. Each polygon defines a surface which can be assigned or given a texture, such as wood, stone, fur, hair, scales, and the like, to enhance the realism of the generated object. Data or information for each texture can be stored in a cache memory and retrieved as necessary to produce the texture on applicable polygons. Different techniques have been developed for accessing the texture information from cache memory. These previously developed techniques, however, are problematic in that they require a relatively large number of logic operations to be performed. Furthermore, if a three-dimensional graphics system is implemented at least in part as an integrated circuit (IC) device, this requirement for a large number of logic operations necessitates large amounts of surface area and more time for processing of such IC device.

SUMMARY

According to one embodiment of the present invention, a circuit for tag checking includes a first comparison gate which compares a first dimension field of a tag with a first dimension element for a group of texels associated with a sample point. A second comparison gate compares a second dimension field of the tag with a second dimension element for the group of texels. A logic gate, coupled to each of the first and second comparison gates, is associated with one texel of the group of texels. The logic gate outputs a predetermined signal if the first and second dimension fields of the tag are the same as the first and second dimension elements, respectively.

A technical advantage of the present invention includes reducing the number of logic operations (and corresponding logic gates) required in order to perform a tag checking process. This can be accomplished, at least in part, by comparing a first dimension (e.g., u) field of a tag with a first dimension (or u) element for a group of texels associated with a sample point and, in a separate operation, comparing a second dimension (or v) field of the tag with a second dimension (or V) element for the same group of texels. Other important technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

The preferred embodiment of the present invention and its advantages are best understood by referring to FIGS. 1 through 6 of the drawings. Like numerals are used for like and corresponding parts of the various drawings.

Figure 1:
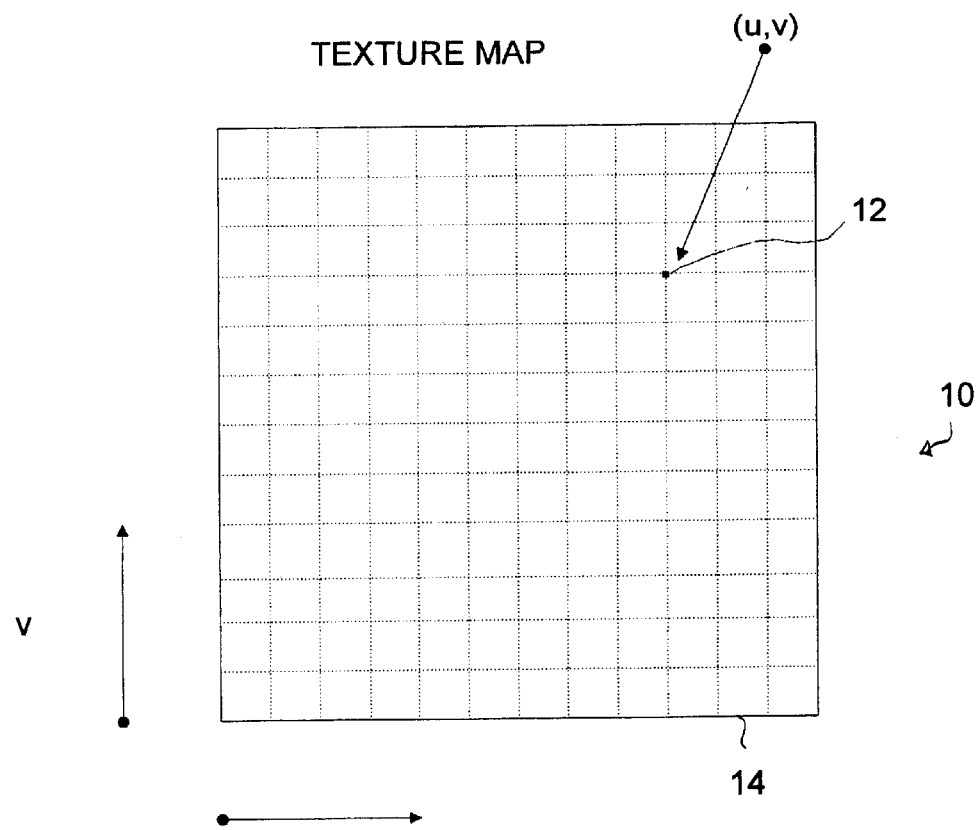
FIG. 1 illustrates an exemplary texture map with a sample point thereon.

FIG. 1 illustrates an exemplary texture map 10 with a sample point 12 located thereon. In general, texture map 10 defines a pattern or texture (not explicitly shown), which can be as simple as stripes and checkerboards, or as complex as wood, stone, sky, fur, hair, scales, and the like. Texture map 10 can be a bitmap, or unchanging graphic, that may be used to cover surfaces like wallpaper. In an imaging technique, texture map 10 can be applied to the surface of a polygon to provide the corresponding texture, thereby enhancing the realism of a virtual object formed from such polygon. As described herein, data or information for texture map 10 is recorded into memory prior to the actual rendering operation which applies the respective texture on a surface. Various techniques which are well-known to those in the art—such as multim in parvum (MIP) mapping and perspective correction—can be used to manipulate texture map 10.

Texture map 10 comprises a number of texture elements or "texels" 14. For clarity, only one texel 14 has been designated with a reference numeral in FIG. 1. In one embodiment, a texture map 10 comprises an n×m (e.g., 32×32) array of texels 14. Each texel 14 can be identified with a set of (u,v) texture coordinates, each of which comprises a u element for defining in a first dimension and a v element for defining in a second dimension. From each set of (u,v) coordinates, a separate tag associated with the respective texel 14 can be formed, as described below in more detail.

Each texel 14 may be separately assigned values for a particular gray scale or, alternatively, a color (e.g., red-green-blue (RGB) combination). Texels 14 may also be assigned values for alpha channel, luminance, and the like. Data for the gray scales, color, alpha channel, luminance, etc. constitutes supporting graphics data for texels 14. The gray scale, color, alpha channel, luminance, and the like, are such that, if texels 14 are each made relatively small and a sufficiently large number are provided, they collectively create the impression or effect of the desired texture (e.g., stripes, checkerboards, wood, stone, sky, fur, hair, scales, etc.).

Figure 3:
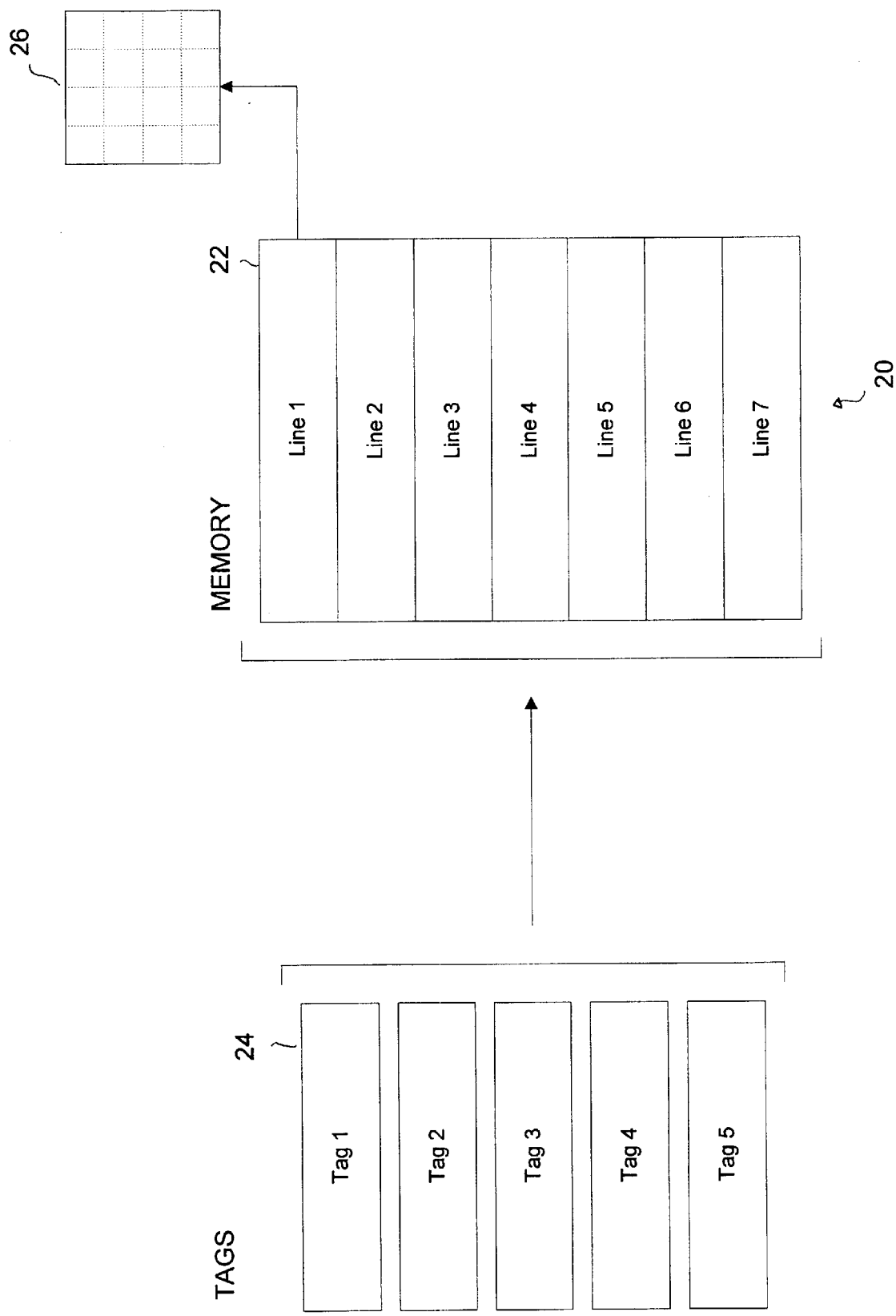
FIG. 3 illustrates an exemplary memory accessible by a number of tags.

Texels 14 can be grouped into p×q (e.g., 4×4) arrays referred to as texture tiles (FIG. 3). Each texture tile is just a portion or sub-part of texture map 10. Accordingly, the p×q array for a texture tile is smaller than the n×m array for texture map 10. In one embodiment, each texture tile can be made small enough so that the supporting graphics data (e.g., gray scale, color, alpha channel, luminance, etc.)

associated with each texture tile can reside in an on-chip static random access memory (SRAM).

Like texels 14, the location for sample point 12 on texture map 10 can be defined by (u,v) texture coordinates. Sample point 12 is exemplary of a point which can be used in a sampling technique to apply texture map 10 to an object's surface. One type of sampling technique is bi-linear sampling.

Figure 2:
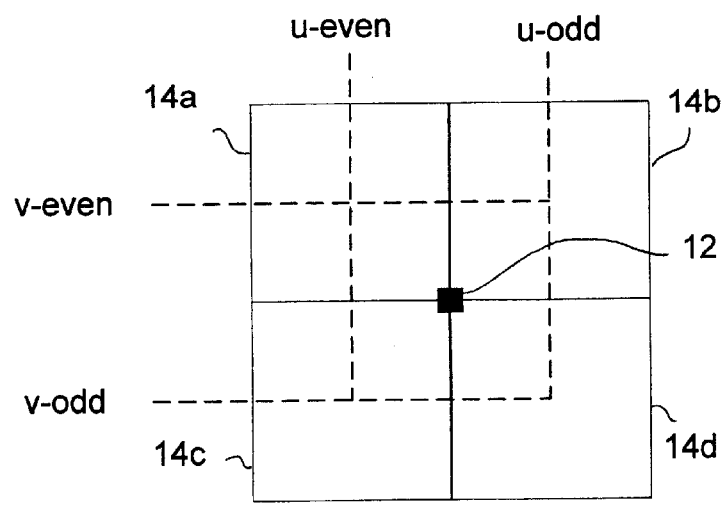
FIG. 2 illustrates the association of a sample point to a number of texture elements or "texels" in a bi-linear sampling technique.

FIG. 2 illustrates the association of sample point 12 to a number of texels 14 (separately designated with reference numerals 14a, 14b, 14c, and 14d) in a bi-linear sampling technique. In general, with bi-linear sampling, sample point 12 is defined relative to the nearest texels 14 in texture map 10. For example, the gray scale or color for sample point 12 is derived from the gray scales or colors of the four texels 14 nearest to sample point 12. This can be accomplished by assigning a certain weight to each of texels 14a–14d based upon proximity to sample point 12, and interpolating between the gray scales or colors of all of texels 14a–14d using the respective weights to yield a gray scale or color for sample point 12. In other words, any sample point 12 which does not exactly match the coordinates for a texel 14 is assigned some gray scale or color based upon the nearest texels 14.

As depicted, texels 14a–14d are arranged in a 2×2 array. Each of texels 14a–14d can be identified by a respective set of (u,v) texture coordinates. Because texels 14a–14d are arranged in a 2×2 array, two each of the respective sets of coordinates have the same u element for the first dimension, and two each of the respective sets have the same v element for the second dimension. In particular, the coordinate sets for texels 14a and 14b have the same "v-even" coordinate, the coordinate sets for texels 14c and 14d have the same "v-odd" coordinate, the coordinate sets for texels 14a and 14c have the same "u-even" coordinate, and the coordinate sets for texels 14b and 14d have the same "u-odd" coordinate.

As an illustrative example, sample point 12 may have the coordinates (38.5, 51.5), and texels 14a, 14b, 14c, and 14d may have the coordinates (38, 52), (39, 52), (38, 51), and (39, 51), respectively. Texels 14a and 14b have the same v coordinate of "52", texels 14c and 14d have the same v coordinate of "51", texels 14a and 14c have the same u coordinate of "38", and texels 14b and 14d have the same u coordinate of "39".

The v elements (e.g., v-even or v-odd) and the u elements (e.g., u-even or u-odd) for identifying texels 14 can each be represented by a respective multi-bit data word. In one embodiment, each such data word may comprise x bits. For each texel 14, an associated tag can be formed from the two data words representing the corresponding v and u elements, as described below in more detail. Each such tag may comprise 2x bits.

FIG. 3 illustrates an exemplary memory 20 comprising a number of lines 22, and accessible by a number of tags 24. For clarity, only one line 22 and one tag 24 are designated with reference numerals in FIG. 3.

Memory 20 generally functions to store the information or data supporting texels 14 in a texture map 10, such data specifying gray-scale, color (e.g., RGB combination), alpha channel, luminance, and the like, for each texel 14. Memory 20 can be a fully associative memory in which a given element of data can be placed anywhere in the memory. Memory 20 can be designed so that different kinds of texels 14 may co-exist.

Memory 20 can be implemented in suitable, high-speed memory for storing frequently used data. For example, memory 20 may comprise level one (L1) cache memory which is located on the same chip as a processor, or alternatively, level two (L2) cache memory which is external to a processor. As such, memory 20 enables a processor to get data much more quickly than if the same data were stored in some other type of memory.

Each line 22 may contain graphics data for a plurality of texels 14. In one embodiment, each line 22 contains graphics data for a texture tile 26, which comprises a p×q (e.g., 4×4) array of texels 14. Stated differently, a texture tile 26 can map into a line 22 of memory 20. Information in memory 20 can be replaced by recycling the "oldest" line 22 first.

In one embodiment, memory 20 may comprise sixty-four lines 22, each line 22 capable of storing 128 bytes of information for a total of eight kilobytes. Thus, for an 8-bit texture type (for RGB, alpha, or luminance), each line 22 contains graphics data for 128 texels 14, which may be arranged as a 16×8 array for a texture tile 26. For a 16-bit texture type (for RGB, alpha, or luminance), each line 22 contains graphics data for 64 texels 14, which may be arranged as an 8×8 array for a texture tile 26. For 24-bit and 32-bit texture types, each line contains graphics data for 32texels 14, which may be arranged as an 8×4 array for a texture tile 26.

Tags 24 are used to access the graphics data for different texels 14 in memory 20. Specifically, the graphics data for a particular texel 14 is accessible from memory 20 by a respective tag 24. Each tag 24 may be derived from the (u,v) coordinates of the corresponding texel 14. Thus, the data or information stored in memory 20 can be indexed by logical coordinates, and not physical memory addresses.

Figure 4:
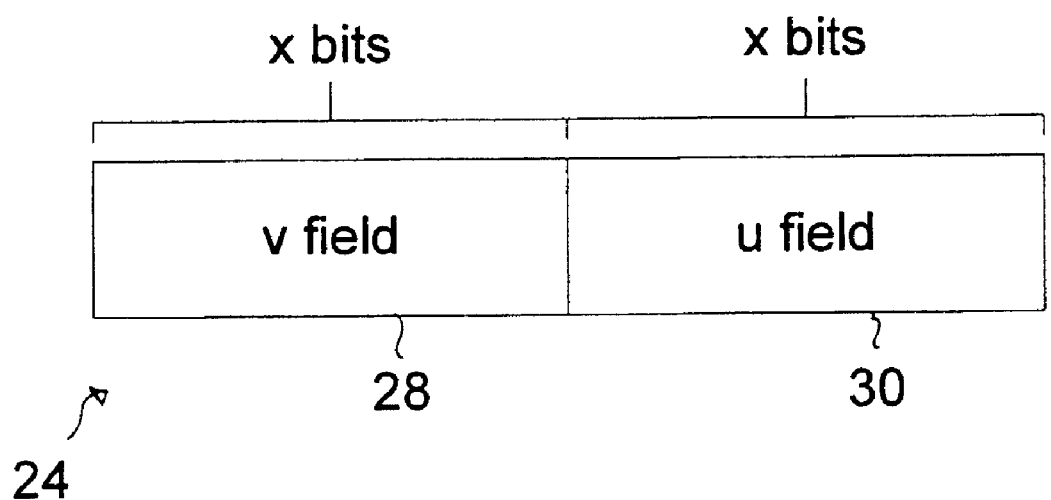
FIG. 4 illustrates the fields in an exemplary tag.

FIG. 4 illustrates details for an exemplary tag 24. As shown, exemplary tag 24 comprises a first dimension field (also referred to as the v field) 28 and a second dimension field (also referred to as the u field) 30. The u field 30 corresponds to, and may specify or be derived from, the first dimension or u element in a (u,v) coordinate set for the texel 14 associated with tag 24. Likewise, the v field 28 corresponds to, and may specify or be derived from, the second dimension or v element in a (u,v) coordinate set for the texel 14 associated with tag 24. Each of v field 28 and u field 30 may comprise x bits of information, so that tag 24 comprises a total of 2x bits. In another embodiment, v field 28 can comprise x bits, while u field 30 can comprise y bits (a different number from x).

Generally, in a bi-linear sampling technique (see, e.g., FIG. 2), graphics data for each texel 14 associated with a particular sample point 12 must be accessed from memory. According to previously developed techniques, this is accomplished by comparing or "checking" each tag 24, as a whole or in its entirety, against the (u,v) coordinate sets for each of the associated texels 14 (e.g., 14a–14d). Assuming that each tag 24 comprises 2x bits of information and that four texels 14 are associated with each sample point 12, such previously developed technique required a minimum of 2x×4×t logic operations, where t is the number of tags 24 to be considered. Such minimum number of logic operations is relatively large, and requires a correspondingly large number of logic gates to implement. The present invention addresses this and other problems by implementing an improved technique for checking tags 24.

Figure 5:
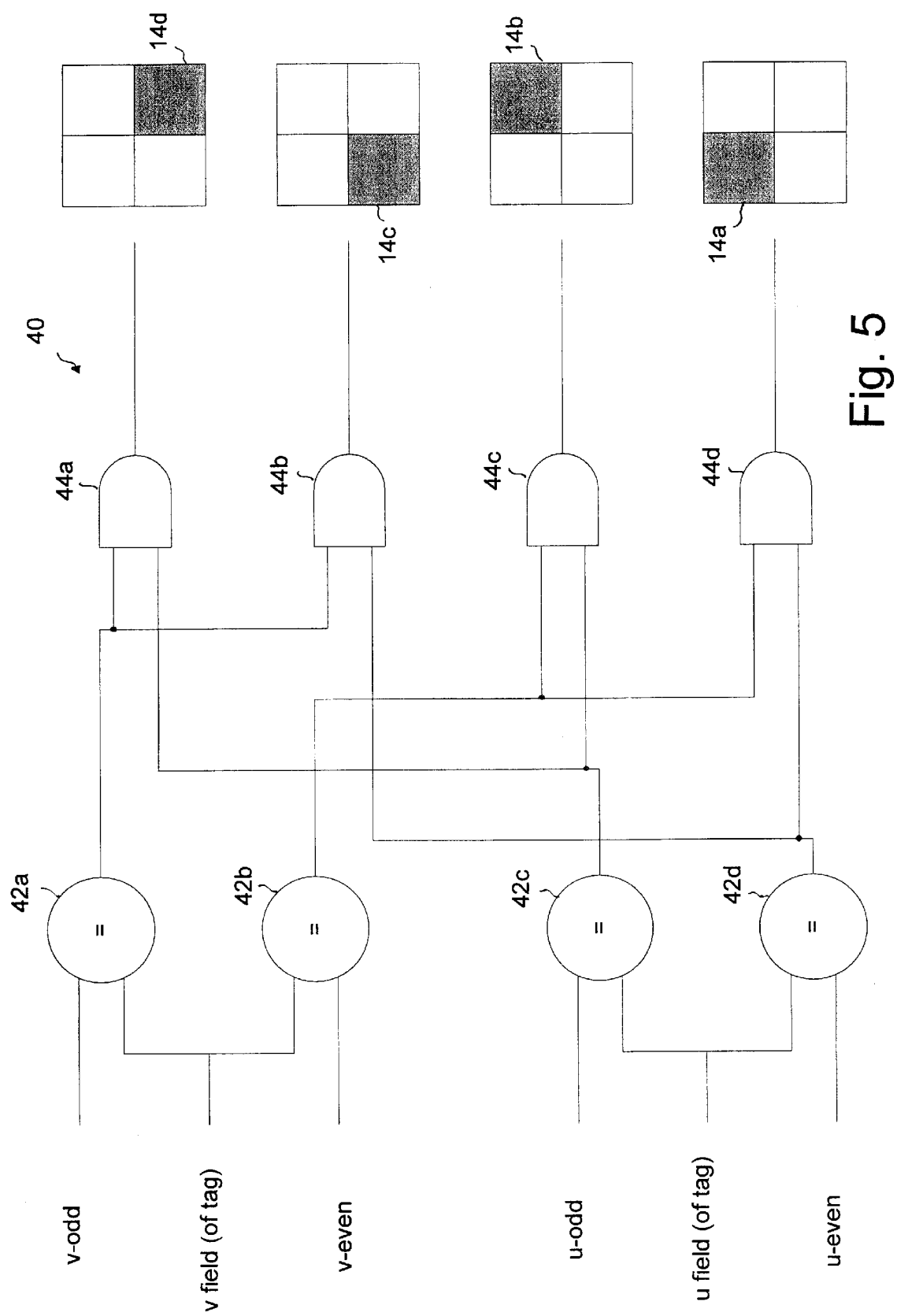
FIG. 5 is a partial schematic diagram of circuitry for performing tag checking, according to an embodiment of the present invention.

FIG. 5 is a schematic diagram of a circuit 40 for performing tag checking, according to an embodiment of the present invention. With circuit 40, the number of logic operations (and corresponding gates) required in order to check a tag 24 is substantially reduced relative to previously developed techniques. To accomplish this, circuit 40 operates separately on the v field 28 and the u field 30 of a tag 24.

In particular, with bi-linear sampling, as described above, a sample point 12 can be associated with an array of texels 14 (e.g., texels 14a–14d), each of which is identifiable with some combination of a v element (e.g., v-even or v-odd) and a u element (e.g., u-even or u-odd). Circuit 40, operating on a tag-by-tag basis, compares the v field of a tag 24 against both the v-even and v-odd elements for the desired grouping of texels 14 and, in a separate comparison, compares the u field of a tag 24 against both the u-even and u-odd elements for the same texels 14.

As shown, circuit 40 includes a number of comparison gates 42 (separately designated with reference numerals 42a, 42b, 42c, and 42d) and a number of AND gates 44 (separately designated with reference numerals 44a, 44b, 44c, and 44d).

Each comparison gate 42 generally functions to compare a first plurality of bits against a second plurality of bits, and will output a predetermined value (e.g., a high or logic level "1") if all of the bits in the first plurality are the same as respective bits in the second plurality. As depicted, comparison gate 42a compares the v field of a tag 24 against the v-odd element for the desired grouping of texels 14. If all the bits in the v field for the tag are the same as respective bits in the v-odd element, then comparison gate 42a outputs a signal (e.g., high) indicating a match. Comparison gate 42b compares the v field of a tag 24 against the v-even element for the desired grouping of texels 14, and outputs a signal indicating a match of the bits v field are exactly the same as respective bits in the v-even element. Similarly, comparison gates 42c and 42d compare the u field of a tag 24 against the u-odd and u-even elements, respectively, for the desired grouping of texels 14, and output match signals if the bits of the u field are exactly the same as the bits in the u-odd and u-even elements, respectively.

Figure 6:
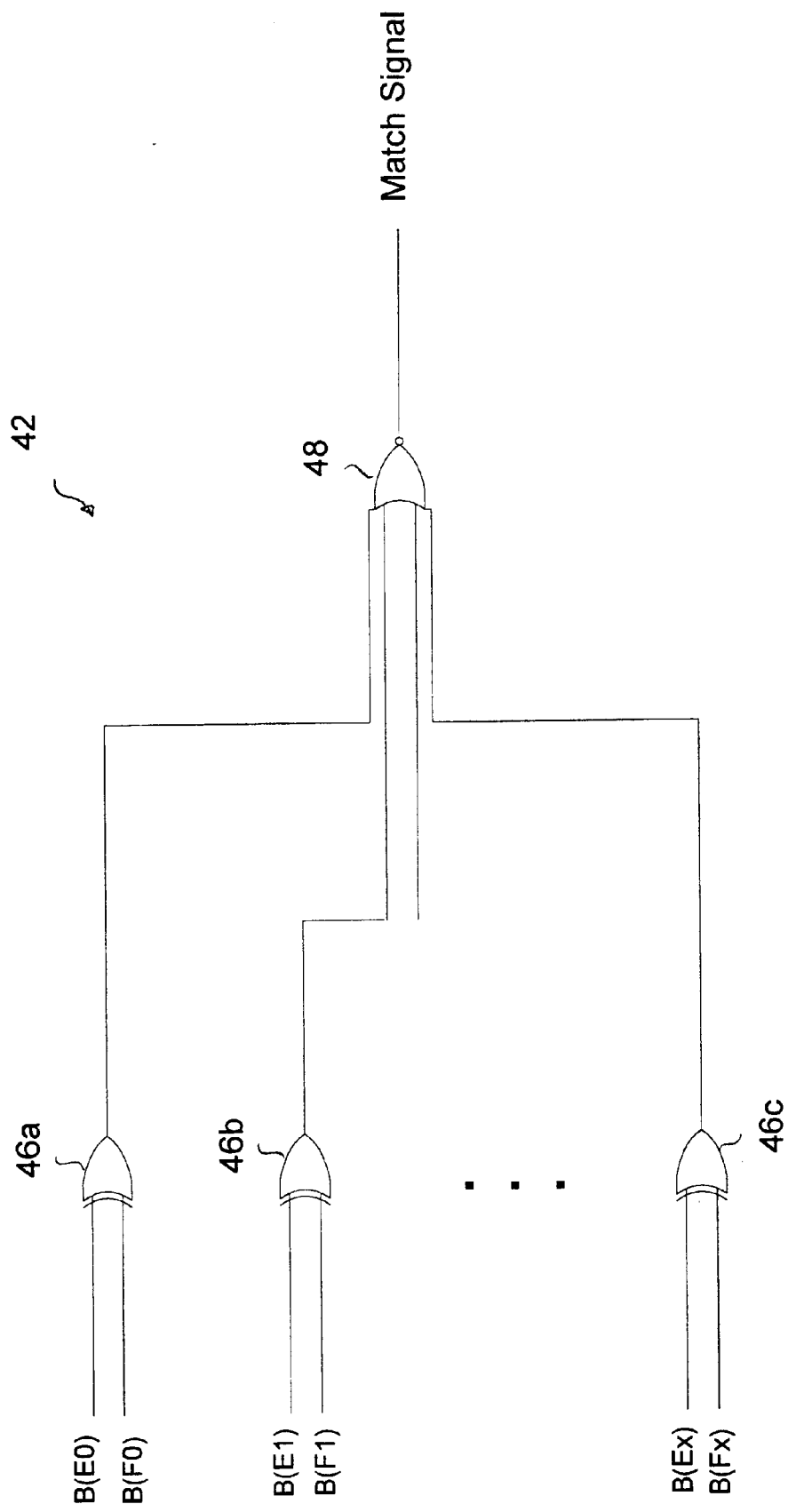
FIG. 6 is an exemplary schematic diagram for a comparison gate, according to an embodiment of the present invention.

In one embodiment, as illustrated in FIG. 6, each comparison gate 42 can be implemented with one or more exclusive OR (XOR) gates 46 (separately designated with reference numerals 46a, 46b, and 46c) and a NOR gate 48. Each XOR gate 46 compares one bit of a tag field (either the u field or the v field) against a respective bit of a coordinate element (e.g., u-even, u-odd, v-even, or v-odd). As depicted, XOR gate 46a compares the first bit of a coordinate element BE(0) against the first bit of a tag field BF(0); XOR gate 46b compares the second bit of the same coordinate element BE(1) against the second bit of the same tag field BF(1); and XOR gate 46c compares an xth bit of the coordinate element BE(x) against the xth bit of the tag field BF(x). For each XOR gate 46, if the two bit elements which are compared are the same, the XOR gate outputs a signal (e.g., a low or logic level "0") indicating such fact. NOR gate 48 receives the outputs of each of XOR gates 46. If the outputs from each of XOR gates 46 is indicative of the fact that the compared bits are the same, NOR gate 48 outputs a match signal.

Referring again to FIG. 5, each AND gate 44 is connected to the output of one of comparison gates 42a and 42b (which operate on the v field of a tag 24) and the output of one of comparison gates 42c and 42d (which operate on the u field of a tag 24). Specifically, AND gate 44a is connected to the output of comparison gates 42a and 42c; AND gate 44b is connected to the output of comparison gates 42a and 42d; AND gate 44c is connected to the output of comparison gates 42b and 42c; and AND gate 44d is connected to the output of comparison gates 42b and 42d. In one embodiment, at least a portion of the comparison operations performed by comparison gates 42a–42d may occur substantially simultaneously.

A separate AND gate 44 is provided for each texel 14 (e.g., texels 14a–14d) in the desired grouping of texels associated with a sample point 12. As shown, AND gate 44a corresponds to texel 14d, AND gate 44b corresponds to texel 14c, AND gate 44c corresponds to texel 14b, and AND gate 44d corresponds to texel 14a. For each AND gate 44, if the two connected comparison gates 42 each output a high signal indicating matches, the AND gate 44 outputs a signal indicating that the tag 24 operated upon by circuit 40 is the tag for the texel 14 (e.g., 14a–4d) associated with such AND gate 44. In other words, such tag 24 has the u and v elements for the texel 14 corresponding to that AND gate 44. Thus, the tag 24 for texel 14d is identified when the u field of such tag is the same as u-odd and the v field of such tag is the same as v-odd. Similarly, the tag 24 for texel 14c is identified when the u field of such tag is the same as u-even and the v field of such tag is the same as v-odd. Likewise, the tag 24 for texel 14b is identified when the u field of the tag is the same as u-odd and the v field of such tag is the same as v-even. The tag 24 for texel 14a is identified when the u field of such tag is the same as u-even and the v field of such tag is the same as v-even.

The overall functionality of circuit 40 can be implemented with other embodiments. For example, if the predetermined value for a match signal (output by comparison gates 42) is a low or logic level "0," then each AND gate 44 can be replaced with a NOR gate. Thus, it should be understood that the present invention is not limited to the exemplary embodiments described herein.

With circuit 40, the number of logic operations is reduced from 2x×4×t (which would be required if each tag 24 was evaluated in its entirety) to 4x×t. Thus, the present invention provides a substantial savings in logic operations and corresponding logic gates.

Although the present invention and its advantages have been described in detail, it should be understood that various changes, substitutions, and alterations can be made therein without departing from the spirit and scope of the invention as defined by the appended claims.

What is claimed is:

1. A circuit for tag checking comprising:

a first comparison gate operable to compare only a v field of a tag with a v-odd dimension element for a group of texels associated with a sample point, the first comparison gate operable to output a first match signal if the v field matches the v-odd dimension element;

a second comparison gate operable to compare only the v field of the tag with a v-even dimension element for the group of texels associated with the sample point, the second comparison gate operable to output a second match signal if the v field matches the v-even dimension element;

a third comparison gate operable to compare only a u field of the tag with a u-odd dimension element for the group of texels associated with the sample point, the third comparison gate operable to output a third match signal if the u field matches the u-odd dimension element; and a fourth comparison gate operable to compare only the u field of the tag with a u-even dimension element for the group of texels associated with the sample point, the fourth comparison gate operable to output a fourth match signal if the u field matches the u-even dimension element.

2. The circuit of claim 1 further comprising:

a first texel-tag match gate coupled to each of the first and third comparison gates, the first texel-tag match gate associated with a first texel of the group of texels and operable to output a first predetermined signal if the first comparison gate outputs the first match signal and the third comparison gate outputs the third match signal;

a second texel-tag match gate coupled to each of the first and fourth comparison gates, the second texel-tag match gate associated with a second texel of the group of texels and operable to output a second predetermined signal if the first comparison gate outputs the first match signal and the fourth comparison gate outputs the fourth match signal;

a third texel-tag match gate coupled to each of the second and third comparison gates, the third texel-tag match gate associated with a third texel of the group of texels and operable to output a third predetermined signal if the second comparison gate outputs the second match signal and the third comparison gate outputs the third match signal;

a fourth texel-tag match gate coupled to each of the second and fourth comparison gates, the fourth texel-tag match gate associated with a fourth texel of the group of texels and operable to output a fourth predetermined signal if the second comparison gate outputs the second match signal and the fourth comparison gate outputs the fourth match signal.

3. The circuit of claim 1 further comprising:

a first texel-tag match gate coupled to each of the first and third comparison gates, the first texel-tag match gate associated with a first texel of the group of texels and operable to output a first predetermined signal if the v and u fields of the tag are the same as the v-odd and u-odd dimension elements, respectively;

a second texel-tag match gate coupled to each of the first and fourth comparison gates, the second texel-tag match gate associated with a second texel of the group of texels and operable to output a second predetermined signal if the v and u fields of the tag are the same as the v-odd and u-even dimension elements, respectively;

a third texel-tag match gate coupled to each of the second and third comparison gates, the third texel-tag match gate associated with a third texel of the group of texels and operable to output a third predetermined signal if the v and u fields of the tag are the same as the v-even and u-odd dimension elements, respectively; and a fourth texel-tag match gate coupled to each of the second and fourth comparison gates, the fourth texel-tag match gate associated with a fourth texel of the group of texels and operable to output a fourth predetermined signal if the v and u fields of the tag are the same as the v-even and u-even dimension elements, respectively.

4. The circuit of claim 1 wherein:

the first comparison gate comprises a first plurality of XOR gates, each XOR gate of the first plurality operable to compare a respective bit of the v field against a respective bit of the v-odd dimension element;

the second comparison gate comprises a second plurality of XOR gates, each XOR gate of the second plurality operable to compare a respective bit of the v field against a respective bit of the v-even dimension element;

the third comparison gate comprises a third plurality of XOR gates, each XOR gate of the third plurality operable to compare a respective bit of the u field against a respective bit of the u-odd dimension element; and the fourth comparison gate comprises a fourth plurality of XOR gates, each XOR gate of the fourth plurality operable to compare a respective bit of the u field against a respective bit of the u-even dimension element.

5. The circuit of claim 4 wherein:

the first comparison gate comprises a first logic gate coupled to the first plurality of XOR gates, the first logic gate operable to output the first match signal if each bit of the v field is the same as the respective bit of the v-odd dimension element;

the second comparison gate comprises a second logic gate coupled to the second plurality of XOR gates, the second logic gate operable to output the second match signal if each bit of the v field is the same as the respective bit of the v-even dimension element;

the third comparison gate comprises a third logic gate coupled to the third plurality of XOR gates, the third logic gate operable to output the third match signal if each bit of the u field is the same as the respective bit of the u-odd dimension element; and the fourth comparison gate comprises a fourth logic gate coupled to the fourth plurality of XOR gates, the fourth logic gate operable to output the fourth match signal if each bit of the u field is the same as the respective bit of the u-even dimension element.

6. A circuit for tag checking comprising:

a first comparison gate operable to compare only the v coordinate field of a tag with a first dimension element for a group of texels associated with a sample point; and a second comparison gate operable to compare only the u coordinate field of the tag with a second dimension element for the group of texels associated with the sample point; and a texel-tag match gate coupled to each of the first and second comparison gates, the texel-tag match gate associated with one texel of the group of texels and operable to output a predetermined signal if the v coordinate and u coordinate fields of the tag are the same as the first and second dimension elements, respectively.

7. The circuit of claim 6 wherein the first comparison gate comprises a first plurality of XOR gates, each XOR gate of the first plurality operable to compare a respective bit of the v coordinate field against a respective bit of the first dimension element, and wherein the second comparison gate comprises a second plurality of XOR gates, each XOR gate of the second plurality operable to compare a respective bit of the u coordinate field against a respective bit of the second dimension element.

8. The circuit of claim 7, wherein:

the first comparison gate comprises a first logic gate coupled to the first plurality of XOR gates, the first logic gate operable to output a match signal if each bit of the v coordinate field is the same as the respective bit of the v element; and the second comparison gate comprises a second logic gate coupled to the second plurality of XOR gates, the second logic gate operable to output a match signal if each bit of the u coordinate field is the same as the respective bit of the u element.

9. A circuit for tag checking comprising:

a first plurality of comparison gates operable to compare only the v coordinate field of a tag with at least two v coordinate elements for a group of texels associated with a sample point;

a second plurality of comparison gates operable to compare only the u coordinate field of the tag with at least two u coordinate elements for the group of texels associated with the sample point; and a plurality of texel-tag match gates, each texel-tag match gate coupled to a respective comparison gate of the first plurality and a respective comparison gate of the second plurality, each texel-tag match gate associated with one texel of the group of texels and operable to output a respective predetermined signal if the v coordinate field of the tag is the same as one of the two v coordinate elements and the u coordinate field of the tag is the same as one of the two u coordinate elements.

10. The circuit of claim 9 wherein each comparison gate of the first and second pluralities comprises a plurality of XOR gates, each XOR gate operable to compare one bit of a v coordinate field or u coordinate field against a respective bit of one of the v or u coordinate elements.

* * * * *